United States Patent [19]

Sugimori et al.

[11] Patent Number: 4,845,065
[45] Date of Patent: Jul. 4, 1989

[54] CARBON MONOXIDE OXIDIZING CATALYST

[75] Inventors: Kenichiro Sugimori; Masaru Yamamoto; Ikuo Horii, all of Toyohashi; Shigeo Ishiguro, Fujisawa; Hajime Matsushita, Yokohama; Hiroshi Ichinose, Kawasaki; Shigenobu Mizusaki, Tokyo, all of Japan

[73] Assignee: Topy Industries, Ltd. and Japan Tobacco, Inc., Japan

[21] Appl. No.: 188,160

[22] Filed: Apr. 15, 1988

Related U.S. Application Data

[63] Continuation of Ser. No. 847,518, Apr. 3, 1986, abandoned.

[51] Int. Cl.$^4$ .......................... B01J 29/06; B01J 23/22
[52] U.S. Cl. ........................ 502/74; 502/213; 502/245; 502/247; 502/331
[58] Field of Search ................ 502/209, 213, 74, 245, 502/247, 331; 423/247, 213.5

[56] References Cited

U.S. PATENT DOCUMENTS

| | | | |
|---|---|---|---|
| 3,224,831 | 12/1965 | Stephens | 502/213.0 |
| 3,438,721 | 4/1969 | Innes | 423/213.5 |
| 3,447,893 | 6/1969 | Stephens et al. | 423/247 |
| 3,540,838 | 11/1970 | Reitmeier et al. | 423/247 |
| 3,789,106 | 1/1974 | Hay | 423/247 |
| 3,914,377 | 10/1975 | Anderson et al. | 423/247 |
| 4,123,388 | 10/1978 | Kerr et al. | 502/209 |
| 4,623,637 | 11/1986 | van der Smissen | 423/247 |

FOREIGN PATENT DOCUMENTS

| | | | |
|---|---|---|---|
| 061891 | 10/1982 | European Pat. Off. | |
| 1417648 | 10/1970 | Fed. Rep. of Germany | |
| 72988 | 6/1976 | Japan | |
| 12691 | 1/1977 | Japan | 423/247 |
| 96399 | 8/1978 | Japan | |
| 149192 | 12/1978 | Japan | |
| 73344 | 6/1980 | Japan | |
| 137039 | 10/1980 | Japan | |
| 662460 | 12/1951 | United Kingdom | 423/247 |

OTHER PUBLICATIONS

*Patent Abstracts of Japan*, vol. 4, No. 113, (55-7334 dated Jun. 13, 1980).

*Primary Examiner*—Carl F. Dees
*Attorney, Agent, or Firm*—Lowe, Price, LeBlanc, Becker & Shur

[57] ABSTRACT

A carbon monoxide oxidizing catalyst for removing carbon monoxide from an air comprises a porous carrier, and on said carrier, a palladium salt and a copper salt as main active components and a vanadium compound or a vanadium compound and a phosphorous compound as a promotor.

20 Claims, 1 Drawing Sheet

CARBON MONOXIDE OXIDIZING CATALYST

This application is a continuation of application Ser. No. 847,518, filed Apr. 3, 1986, abandoned.

BACKGROUND OF THE INVENTION

This invention relates to a carbon monoxide oxidizing catalyst particularly for removing carbon monoxide from an air containing it.

In general, carbon monoxide (referred to as CO hereinafter) evolves by uncomplete combustion of simple substances or compounds of carbon and becomes attached very firmly to hemoglobin in blood, forming CO-hemoglobin, which prevents remarkably the functions of blood to absorb and carry oxygen, resulting in developing acute poisonous symptoms such as headaches or dizziness, extremely causing death. Also it is said the long-term exposure to an air containing a high concentration of carbon monoxide induces chronic heart diseases.

CO oxidizing catalysts are used for converting harmful CO in an air into innocuous carbon dioxide ($CO_2$). For example, they are packed in air cleaners, the absorption chamber of gas masks, or filters. At present, there is a need for the development of CO oxidizing catalyst not only capable of efficiently oxidizing CO and thereby cleaning air containing a high concentration of CO but also having a superior durability permitting a long-term use.

So far are known many CO oxidizing catalysts usable under natural conditions, i.e. ordinary ambient temperature, atmospheric pressure and humidity. They are roughly classified as follows:

(1) Metallic oxide catalysts
(2) Precious metal catalysts
(3) Redox catalysts.

(1) A typical known catalyst is the so-called hopcalite catalyst consisting essentially of manganese dioxide and copper oxide (disclosed in Japanese laid-open patent application Nos. 72988/1976 and 96399/1978). It however has a disadvantage of being affected by moisture which rapidly destroys the activity, and hence the combined use of it with a powerful dehydrating agent is necessary.

(2) Some catalysts containing a precious metal such as palladium or platinum have been disclosed in Japanese laid-open patent application Nos. 73344/1980, 149192/1978 and 137039/1980. Any of these has a disadvantage that though the effect of removing CO from an air is adequate when it is of a relatively low concentration (2000 ppm), their activity is poor for a relatively high CO concentration (1%) and decays in a short time.

(3) A redox pair catalyst is typical which is composed of palladium chloride and cupric chloride and known as the so-called Wacker catalyst. The catalyst which was developed for the purpose of synthesizing acetaldehyde from ethylene also has a high activity of oxidizing CO. The mechanism of oxidation of CO in the presence of the Wacker catalyst is presented by the reaction equations (J. Air Pollution Control Assoc. 28: 253, 1978):

$$CO + PdCl_2 \cdot 2H_2O \rightarrow CO_2 + Pd\cdot + 2HCl + H_2O \quad (1)$$

$$Pd\cdot + (CuCl_2)_2 \cdot 2H_2O \rightarrow PdCl_2 \cdot 2H_2O + Cu_2Cl_2 \quad (2)$$

$$Cu_2Cl_2 + 2HCl + H_2 + \tfrac{1}{2}O_2 \rightarrow (CuCl_2)_2 \cdot 2H_2O \quad (3)$$

If (1)+(2)+(3)

$$\text{then } CO + \tfrac{1}{2}O_2 \rightarrow CO_2 \quad (4)$$

A problem is encountered also in this catalyst in that when carried on a porous carrier and used over a long time as a CO oxidizing catalyst, its temperature is raised by the oxidation heat of CO, and HCl is produced as expressed by equation (1) and volatilized away from the system, thus the redox cycle becomes gradually unbalanced, resulting in a fall in the CO oxidation rate.

SUMMARY OF THE INVENTION

With special regard to these difficulties, it is the principal object of the invention to provide a CO oxidizing catalyst having a satisfactory durability of high activity permitting long-term use under natural conditions.

The inventors have endeavored to study the improvement in the durability the conventional redox catalyst, which is composed of palladium chloride and cupric chloride to permit it to maintain its high CO oxidizing activity throughout a long use time, and as a result found the addition of vanadium element or a compound of it and a phosphorus compound as a promotor prevents the activity of the redox catalyst from being destoyed. Thus, the invention has been accomplished.

The invention provides a CO oxidizing catalyst comprising a porous carrier carrying thereon as main active components palladium salt and copper salt and in addition a promotor consisting of a vanadium compound, or of a vanadium compound and a phosphorus compound.

Vanadium compounds suitable for use in the invention, which are to be added to the redox catalyst, are such as ammonium methavanadate ($NH_4VO_3$), sodium vanadate ($NaVO_3$) and vanadium oxide ($V_2O_5$). Examples of suitable phosphorus compounds are phosphoric acid ($H_3PO_4$), phosphorus pentoxide ($P_2O_5$) and ammonium phosphate ($(NH_4)_3PO_4$).

A palladium compound preferred as a component of the redox catalyst is palladium chloride ($PdCl_2$) but palladium sulfate ($PdSO_4$) and palladium nitrate ($Pd(NO_3)_2$) may be used in combination. As copper salt are used preferably cupric chloride ($CuCl_2$), and also other such as cuprous chloride ($CuCl$), copper sulfate ($CuSO_4$) and cupric nitrate ($Cu(NO_3)_2$).

Examples of suitable carriers for use in the invention are γ-alumina, active carbon, silica-alumina and zeolite. Any other porous material suitable for a catalyst carrier may be used without being particularly limited. Carriers of honeycomb-structured material or sponge-tissue ceramic can be used.

Suitable rates of deposited active components to their carrier are as follows: palladium salt, 0.01–0.2 m mol/g; and copper salt, 0.1–2.0 m mol/g, preferably 0.4–1.0 m mol/g. Further any vanadium compound is deposited onto a carrier (as vanadium) in 0.1–3.0% by weight, preferably 0.5–1.5% by weight calculation with respect to vanadium. Rate of phosphorus compound to a carrier may be within 0.1–1.0% by weight as phosphorus.

The deposition of active substances on the carrier is made according to the following procedure: a carrier is immersed in an aqueous solution containing a palladium salt, a copper salt and a vanadium compound, or additionally a phosphorus compound, heated with consequent concentration and evaporation of water, to be deposited on the carrier. Another procedure may be applied in which previously a vanadium compound or both a vanadium compound and a phosphorus compound are deposited on the carrier, followed by heat treatment at not less than 100° C., and then a palladium salt and a copper salt are deposited by the above-mentioned procedure.

The mechanism of action of the vanadium compound added in accordance with the invention is regarded as expressed by the series of reaction equations:

$$CO + Pd(OH)_2 \rightarrow CO_2 + Pd\cdot + H_2O \quad (5)$$

$$Pd\cdot + V_2O_5 + H_2O \rightarrow Pd(OH)_2 + V_2O_4 \quad (6)$$

$$V_2O_4 + \tfrac{1}{2}O_2 \rightarrow V_2O_5 \quad (7)$$

If (5)+(6)+(7), $$\text{then } CO + \tfrac{1}{2}O_2 \rightarrow CO_2 \quad (8)$$

In this way, the temperature of the catalyst is raised through the influence of oxidation heat of CO, accompanied by thermal decomposition in part of palladium chloride and volatilation of hydrogen chloride (HCl), with the resulting conversion into palladium hydroxide (Pd(OH$_2$)), which combines with vanadium oxide (V$_2$O$_5$) to make a redox pair. In this way oxidation proceeds following the reaction equations (5) through (7).

The long-term duration of CO oxidating activity is understood as coming from the fact that the activity of the redox pair consisting of palladium chloride-copper chloride reduces as the result of volatilation of hydrogen chloride but the reduction is compensated by the newly produced redox pair consisting of palladium hydroxide and vanadium oxide. Addition of a phosphorus compound as well as vanadium oxide can further promote the above-mentioned effect.

DETAILED DESCRIPTION OF THE EMBODIMENTS

Figure 1:
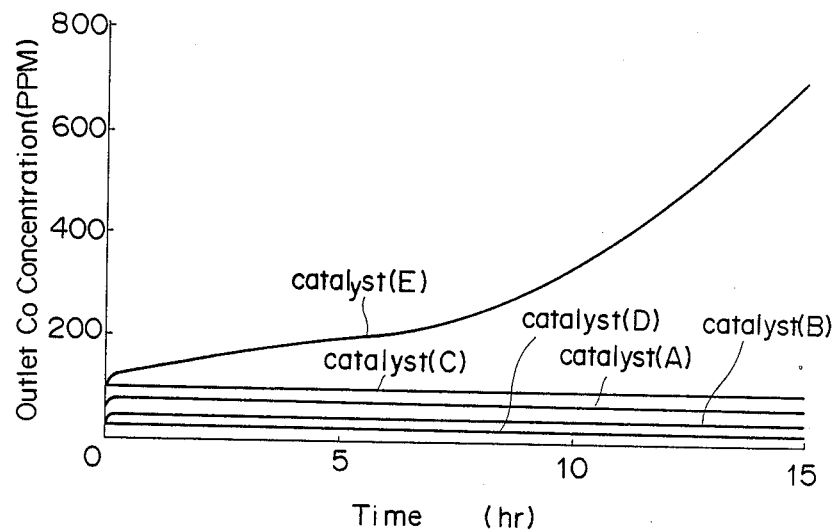
FIG. 1 is a graph showing change with the passage of time in CO oxidizing activities of different catalysts according to the invention.

The invention will be described more fully by way of examples with reference to the accompanying drawings hereinafter:

(1) PREPARATION OF CATALYSTS

Example 1

To 1300 ml of an aqueous solution 7 g of palladium, 44 g of copper base and 5 g of vanadium were added as palladium chloride, cupric chloride and ammonium methavanadate. In the resulting preparation, 1 Kg of γ-alumina having particle sizes of 8–14 meshes was immersed for 5 hours. Then water was evaporated at 120° C. in a through-flow dryer with occasional agitation. After the drying for 12 hours, the resulting catalyst (A) according to the invention was taken out of the dryer.

Example 2

To 1300 ml of an aqueous solution 5 g of vanadium ion (V$^{5+}$) as ammonium methavanadate was added. In the obtained preparation, 1 Kg of γ-alumina having particle sizes of 8–14 meshes was immersed for 4 hours. Then water was evaporated at 130° C. in a through-flow dryer with occasional agitation for 12 hours, followed by additional thermal treatment at 500° C. for 2 hours. On the resulting V$_2$O$_5$ carrying γ-almina, the same quantity of palladium chloride and cupric chloride were deposited by a procedure similar to that of Example 1, thus catalyst (B) according to the invention was obtained.

Example 3

A honeycomb structure (diameter: 50 mm, height: 8.15 mm, no. of cells per inch$_2$: 112) of cordierite with a γ-alumina layer on the surface was immersed in 500 ml of 0.1 mol/l NH$_4$VO$_3$ aqueous solution for 3 hours, followed by drying at 120° C. The same immersion and drying were repeated three times. Then 2 hours' thermal treatment at 500° C. was made. In addition, the resulting V$_2$O$_5$ carrying honeycomb structure was immersed in 500 ml of an aqueous solution containing palladium chloride (0.1 mol) and cupric chloride (1.0 mol). After immersion for 3 hours, the honeycomb structure was removed, followed by drying at 150° C., and thus another catalyst (C) was obtained.

Example 4

To 1300 ml of an aqueous solution 5 g of vanadium ion (V$^{5+}$) and 3 g of phosphorus ion (P$^{5+}$), as ammonium methavanadate and phosphoric acid were added. In the obtained preparation, 1 Kg of γ-alumina having particle sizes of 8–14 meshes was immersed for 4 hours, followed by thermal treatment in the same way as in Example 2. On the resulting V$_2$O$_5$-carrying γ-alumina, the same quantity of palladium chloride and cupric chloride were deposited by the similar procedure to that of Example 1. Thus catalyst (D) according to the invention was obtained.

Example 5

In the same way as in Example 1, except for without ammonium methavanadate (NH$_4$VO$_3$), a control catalyst (E) was obtained.

(2) DETERMINATION OF CO OXIDIZING ACTIVITY

The CO oxidizing activities of catalysts (A), (B), (C) and (D) according to the invention and control catalyst (E) were determined in the following procedure: A sample of catalyst (160 ml) was packed in a glass tube of 50 mm in inner diameter. Through the catalyst column, an air (relative humidity: 95%, temperature; 25° C.) having a CO concentration of 1.0% by volume was passed at a flow rate of 32 l/min. In this state, CO concentration was measured at the outlet with a non-dispersion type infrared spectrophotometer. The obtained results are summarized in FIG. 1.

As seen from FIG. 1, compared with the control vanadium-free catalyst (E), any of the catalysts according to the invention (A), (B), (C) and (D) have proved to be extremely durable without a substantial decrease in CO oxidizing activity throughout a long-term use.

As described above, the CO oxidizing catalyst according to the invention, which is a modified redox catalyst which contains a redox catalyst consisting of palladium chloride and copper chloride in combination with a vanadium compound alone or both a vanadium compound and a phosphorus compund, not only has a high CO oxidizing activity but also is markedly superior in duration of the CO oxidizing activity.

What is claimed is:

1. A carbon monoxide oxidizing catalyst comprising a porous carrier and, on said carrier, a redox catalyst comprising a palladium salt and a copper salt as main active components and a promotor selected from the group consisting of a vanadium compound and a combination of a vanadium compound and a phosphorous compound, said promotor being capable of forming a redox pair with palladium hydroxide formed during carbon monoxide oxidation.

2. A carbon monoxide oxidizing catalyst defined in claim 1, wherein said carrier is $\gamma$-alumina.

3. A carbon monoxide oxidizing catalyst defined in claim 1, wherein said carrier is silica-alumina.

4. A carbon monoxide oxidizing catalyst defined in claim 1, wherein said carrier is zeolite.

5. A carbon monoxide oxidizing catalyst defined in claim 1, wherein said carrier is a honeycomb-structured material.

6. A carbon monoxide oxidizing catalyst defined in claim 1, wherein said carrier is a sponge-tissue ceramic.

7. A carbon monoxide oxidizing catalyst defined in claim 1, wherein said palladium salt is palladium chloride.

8. A carbon monoxide oxidizing catalyst defined in claim 1, wherein said palladium salt is palladium sulfate.

9. A carbon monoxide oxidizing catalyst defined in claim 1, wherein said palladium salt is palladium nitrate.

10. A carbon monoxide oxidizing catalyst defined in claim 1, wherein said copper salt is cupric chloride.

11. A carbon monoxide oxidizing catalyst defined in claim 1, wherein said copper salt is copper sulfate.

12. A carbon monoxide oxidizing catalyst defined in claim 1, wherein said copper salt is copper nitrate.

13. A carbon monoxide oxidizing catalyst defined in claim 1, wherein said vanadium compound is ammonium methavanadate.

14. A carbon monoxide oxidizing catalyst defined in claim 1, wherein said vanadium compound is sodium vanadate.

15. A carbon monoxide oxidizing catalyst defined in claim 1, wherein said vanadium compound is vanadium oxide.

16. A carbon monoxide oxidizing catalyst defined in claim 1, wherein the rate of said palladium salt to said carrier is 0.01–0.2 m mol/g.

17. A carbon monoxide catalyst defined in claim 1, wherein the rate of said copper salt to said carrier is 0.1–2.0 m mol/g.

18. A carbon monoxide oxidizing catalyst defined in claim 1, wherein the rate of said vanadium compound to said carrier is 0.1–3.0% by weight.

19. A carbon monoxide oxidizing catalyst defined in claim 1, wherein the rate of said phosphorus compound to said carrier is 0.1–1.0% by weight.

20. A carbon monoxide oxidizing catalyst comprising a porous carrier and, on said carrier, a redox catalyst comprising 0.01–0.2 m mol of a palladium salt per g carrier and 0.1–2.0 m mol of a copper salt per g carrier as main active components and a promotor selected from the group consisting of 0.1–3.0 weight percent of a vanadium compound and a combination of 0.1–3.0 weight percent of a vanadium compound and 0.1–1.0 weight percent of a phosphorous compound, based on the weight of the carrier, said promotor being capable of forming a redox pair with palladium hydroxide formed during carbon monoxide oxidation.

* * * * *